US008129855B1

(12) United States Patent
Tong et al.

(10) Patent No.: US 8,129,855 B1
(45) Date of Patent: Mar. 6, 2012

(54) PORTABLE TURBINE SYSTEMS (76) Inventors: Lucas Tong, Mountain View, CA (US); Cameron Smith, Mountain View, CA (US)

(*) Notice: Subject to any disclaimer, the term of this patent is extended or adjusted under 35 U.S.C. 154(b) by 585 days.

(21) Appl. No.: 12/315,456

(22) Filed: Dec. 2, 2008

Related U.S. Application Data (60) Provisional application No. 61/005,180, filed on Dec. 2, 2007, provisional application No. 61/126,166, filed on Apr. 30, 2008, provisional application No. 61/065,541, filed on Feb. 12, 2008.

(51) Int. Cl.
*F03B 13/00* (2006.01)
(52) U.S. Cl. ........................................................ 290/54
(58) Field of Classification Search .................. 290/43, 290/53–55
See application file for complete search history.

(56) References Cited

U.S. PATENT DOCUMENTS

| | | | | |
|---|---|---|---|---|
| 4,324,985 A | * | 4/1982 | Oman | 290/55 |
| 4,335,093 A | * | 6/1982 | Salomon | 423/644 |
| 4,488,055 A | * | 12/1984 | Toyama | 290/53 |
| 5,243,224 A | | 9/1993 | Tagney, Jr. | |
| 5,424,582 A | | 6/1995 | Trepl, II et al. | |
| 5,644,170 A | | 7/1997 | Bynum et al. | |
| 6,107,692 A | * | 8/2000 | Egri et al. | 290/43 |
| 6,246,125 B1 | | 6/2001 | Axtell | |
| 6,551,053 B1 | * | 4/2003 | Schuetz | 415/3.1 |
| 6,624,530 B1 | | 9/2003 | Toulon | |
| 6,833,631 B2 | | 12/2004 | Van Breems | |
| 7,227,276 B2 | * | 6/2007 | Caiozza | 290/55 |
| 7,525,224 B2 | * | 4/2009 | Takenaka et al. | 310/54 |
| 2006/0108808 A1 | * | 5/2006 | Chen | 290/54 |

OTHER PUBLICATIONS

The inside of a self-powered LED flashlight by DuraPRO, (www.durapro.com), before Apr. 2008, 2 pages.

* cited by examiner

*Primary Examiner* — Dang Le (57) ABSTRACT

Novel apparatus and techniques for harnessing wind and/or moving-liquid energy using one or more portable turbine systems are disclosed. One embodiment includes a portable stream turbine system having a hub with many paddles, held by an axle in a housing. The system further includes a disk fixed to the hub and extended out of the housing to be also fixed to a gear structure, which is connected to a generator. The output of the generator can be connected to electronics to perform different functions. Another embodiment includes a number of portable turbine systems removably attached together to form an array. In one example, the number of portable turbine systems in an array can be adjustable, depending on needs. The different embodiments regarding a stream turbine system can further include a floatation mechanism to keep the different embodiments afloat or partially afloat in a fluid. The different embodiments regarding a stream turbine system or an array of stream turbine systems can also include a drifting prevention mechanism to prevent the embodiments from being drifted away, and to substantially maintain the orientation of the embodiments in a fluid.

20 Claims, 5 Drawing Sheets

PORTABLE TURBINE SYSTEMS

CROSS REFERENCE TO RELATED APPLICATIONS

This application claims benefit of (i) U.S. Provisional Patent Application No. 61/005,180, filed Dec. 2, 2007, and entitled "Turbines in Household Drainage Pipes and Portable Turbine Systems," and (ii) U.S. Provisional Patent Application No. 61/065,541, filed Feb. 12, 2008, and entitled "Turbines in Household Drainage Pipes and Portable Turbine Systems," and (iii) U.S. Provisional Patent Application No. 61/126,166, filed Apr. 30, 2008, and entitled "Portable Turbine Systems," all of which are hereby incorporated herein by reference.

BACKGROUND OF THE INVENTION

1. Field of the Invention

The present invention relates generally to turbines and more particularly to portable turbines.

2. Description of the Related Art

Energy from wind and flowing liquid are renewable and clean natural resources. They do not pollute the environment, and could provide tremendous amount of the energies we need. Thus, it is not surprising that numerous countries are increasingly depending on large wind and water turbines for their energy. For example, in 2007, wind power provides about 20% of Denmark's electricity.

Many other countries are setting ambitious targets requiring 10 or more percentage of their energy from these renewable resources. For example, New Jersey has targeted offshore wind farms to help them produce 22.5% of their power from renewable energy sources by 2021. Rhode Island has approved its plan to build a 385-megawatt wind farm off their coast. When completed, the farm would supply 15% of Rhode Island's power. These projects are on the right track, but face numerous challenges. For example, they are very expensive. The Rhode Island project would cost more than $1 billion. In addition, such large projects with huge turbines require zoning and permits, and have their environmental impact. It is not uncommon to take a number of years before construction can even start. In view of large fluctuation in oil prices and the possibility of global recession, realizing these large and expensive projects may be very difficult.

It should be apparent from the foregoing that there is still a need for ways to harness the flowing-liquid and/or wind power in a smaller scale.

SUMMARY OF THE INVENTION

In one embodiment, the present invention provides an inexpensive and portable turbine system that is easily transportable. The turbine system can generate electricity for different purposes, such as to charge a battery, a computer and a cellular phone, and to run other electrical devices. With the systems being portable, a user can take it around and have power even when the user is stranded in a remote and isolated area. For example, if there is a running stream nearby, a portable stream turbine system, according to one embodiment, can provide electricity for the user.

In another embodiment, a number of portable turbine systems are connected together. Such an array of turbines generates more power than a single one. The number of turbine systems to be connected can be adjustable, depending on the needs of the user.

Different embodiments of the invention can be implemented in numerous ways including, a method, system, device, and a computer readable medium. Several embodiments of the invention are discussed below.

In one embodiment, a portable turbine system has a rotor assembly, which includes a shaft or an axle with blades attached. When fluid hits the blades, they rotate and generate electricity. The fluid can be, for example, air or water. In one approach, the rotor assembly can rotate in a way similar to a fan.

In another embodiment, a portable turbine system includes a hub with paddles, held by a shaft or an axle in a housing. The housing includes an input channel and an output channel, both located close to the bottom of the housing. Also, the system includes a disk, which can be in the shape of a cylinder, fixed to the hub and extended out of the housing to be also fixed to at least a gear of a gear structure. As fluid pushes the paddles, the hub turns, which turns the disk and the gears to run a generator. The output of the generator can be connected to a number of electrical components to perform a function.

Instead of a type of fluid moving through a relatively stationary turbine system, in one embodiment, the portable turbine system is moved through the fluid to generate electricity.

In one application, a portable turbine system according to one embodiment is used to measure the speed of flow of a fluid turning its paddles. In one embodiment, the turbine system can wirelessly transmit information regarding the speed measured to another device.

Yet another embodiment includes a number of portable turbine systems. The turbine systems can be removably attached together by connecting mechanisms. The number of such portable turbine systems to be connected together can be adjustable, depending on the needs of the user.

In one example, a portable stream turbine system or an array of stream turbine systems can include a floatation mechanism. Using a stream turbine system as an example, the floatation mechanism keeps the turbine system afloat on a liquid, with at least a portion of its input channel in the liquid. The floatation mechanism can be a gaseous balloon. In another example, the floatation mechanism can be a platform made of floating materials. The stream turbine system can be supported by the platform, with at least a portion of the turbine system below the platform. In another example, the system is partially surrounded by the platform, such as with the input channel not blocked by the platform.

In one approach, a portable stream turbine system or an array of stream turbine systems can be prevented from being drifted away by different drifting prevention mechanisms. The drifting prevention mechanisms prevent the system(s) from being drifted away when the system(s) is in a fluid. The drifting prevention mechanisms can also substantially maintain the orientation of the system(s), which enhances the liquid flow into the input channel(s) of the system(s).

In one example, a drifting prevention mechanism depends on connecting the portable turbine system(s) to stationary objects on land. In another example, a drifting prevention mechanism depends on connecting the portable turbine system(s) to substantially stationary locations in the liquid. In yet another example, a drifting prevention mechanism depends on connecting the portable turbine system(s) to a floating object, which is made substantially stationary by, for example, being connected to a substantially stationary object. Examples of floating objects include a floating platform, a boat and a buoy.

An array of turbine systems can be a row of turbine systems. In yet another embodiment, there can be rows and columns of portable turbine systems connected together.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

Same numerals in FIGS. 1-5 are assigned to similar elements in all the figures. Embodiments of the invention are discussed below with reference to FIGS. 1-5. However, those skilled in the art will readily appreciate that the detailed description given herein with respect to these figures is for explanatory purposes as the invention extends beyond these limited embodiments.

DETAILED DESCRIPTION OF THE INVENTION

A number of embodiments of the invention pertain to a portable turbine system. The system can be portable or handheld. The turbine system transforms kinetic energy in a fluid into kinetic energy in a turning turbine, which, in turn, generates electricity via a generator. The electricity generated can be used for different purposes. To illustrate, electricity generated can be stored in an energy storage medium, such as a battery. Or the electricity can be used to charge a computer, a cellular phone etc. Instead of storing the electricity, the electricity can be used to generate light, run an electronic device or operate other appliances.

In one embodiment, a portable turbine system includes a portable or handheld hollow tube, with a turbine embedded inside the tube. Fluid flowing through the tube turns the turbine to generate electricity. Examples for the fluid include some form of gases, such as air, or some form of liquid, such as water, which can be from a stream, rain, or sea. In the case of the fluid being a gas, the system can be a wind turbine system; and in the case of the fluid being liquid, the system can be a stream turbine system.

A user can align the tube of a portable turbine system according to one embodiment in a running river, such as with the longitudinal axis of the tube in line with the flow direction of the river. The running river can continuously turn the turbine to generate electricity. For example, the user can place a portable turbine system according to one embodiment in the river at night to have a battery charged during the night time. In another example, the person can place such a portable turbine system with the tube upright in a water fall or a rain forest during rain to generate electricity.

The turbine can include a rotor assembly, which can be a shaft or an axle with blades attached. As moving fluid hits the blades, or as the blades move through the fluid, the blades rotate. The rotation can be used to generate electricity.

In one approach, the rotor assembly can rotate in a way similar to a fan, with the blades positioned in a plane substantially perpendicularly to the direction of the flow of the fluid hitting the blades.

Figure 1:
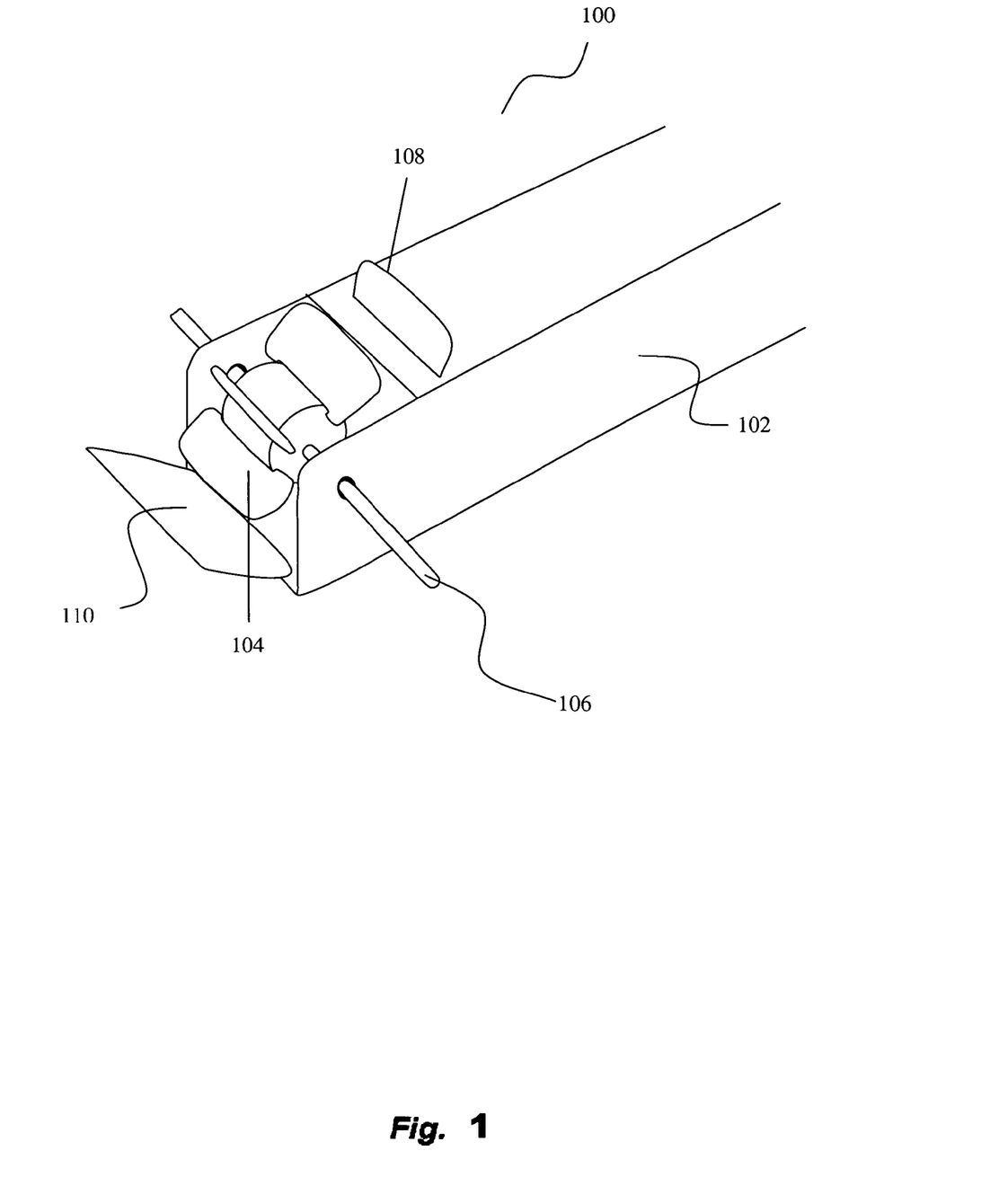
FIG. 1 shows one embodiment of a portable turbine with a hub and paddles in a tube according to the present invention.

In another approach, a rotor assembly can include a wheel or a hub, with an axle or a shaft, and the wheel has paddles. The rotor assembly can be in a tube. When fluid flows through the tube, the fluid hits the plane of the paddles, pushing the paddles. Then the wheel and the axle turn in an axis substantially perpendicular to the flow direction of the fluid. FIG. 1 shows one example of such a rotor assembly 100, with a wheel having paddles. In one example, a number of paddles are substantially evenly spaced apart on the wheel.

As shown in FIG. 1, as fluid flows through a tube 102, a wheel 104 with paddles turns. The shaft or axle 106 of the wheel extends across the tube to hold the wheel in the tube. In this example, a portion of the upper (or lower) part of the wheels is blocked from being directly hit by the fluid via a piece of material 108. The piece of material 108 can serve as a cover. The cover can be made of plastic or other types of rigid or semi-rigid materials. This cover can be in close proximity to the wheel, and is positioned before the fluid hits the wheel. As the fluid in the tube flows towards the wheel, the cover blocks a portion of the fluid from directly hitting the wheel. To illustrate, with the cover 108, the fluid in the tube only directly hits a portion of the wheel with the paddles, such as the bottom quarter. The fluid hitting the bottom portion, such as the bottom quarter of the tube, turns the paddles, which turns the wheel.

In one embodiment, the tube 102 at the position close to the bottom of the wheel, is curved upwards towards the wheel. This can be done, such as, by a lip 110 as shown in FIG. 1. The lip 110 guides some of the fluid that has flowed past the bottom of the wheel back towards the wheel to further turn the wheel 104.

As the wheel turns, its axle 106 turns also. In one example, the axle 106 is connected to an electric generator to generate electricity.

In another embodiment, instead of the axle 106 directly connected to an electric generator, the axle 106 is connected to one or more gears to increase the turning speed for the electric generator. The one or more gears can extend up one of the side walls of the tube. The one or more gears can be mounted in a gear box, and the box can be mounted on one of the side walls of the tube 102.

In one embodiment, at least a portion of the gear box (or the number of gears or the gear ratio) can be changed, depending on the speed or power of flow of the fluid in the tube 102.

A number of embodiments have been described regarding the applications of a portable turbine system where the system is relatively stationary in an environment of moving fluid, such as running water. In yet another embodiment, the system can be moving through a fluid. For example, the system is mounted to a vehicle. As the vehicle moves through a fluid, the fluid turns a turbine in the system. To illustrate, the vehicle can be a boat moving through a river, and the tube with the turbine can be mounted on a side of the boat. Also, the turbine system can be mounted low enough so that as the boat moves, water flows into the tube to turn the turbine.

In yet another embodiment, the fluid is not a liquid, but is a gas. For example, the vehicle can be a car running on a road, with a portable turbine system mounted on the car. As the car moves, air flows through the turbine to generate electricity. As another example, a portable turbine system is mounted on a bicycle. As a person is riding the bike, air flows through the turbine to generate electricity, which can be used, for example, to turn on a flash light for the bicycle.

A number of embodiments have been described where a portable turbine system is mounted onto an apparatus that moves. In yet another embodiment, a portable turbine system can be connected to or carried by a living being, such as a person. For example, the system can be mounted on a hat/cap, a pair of eyeglasses, or the clothing of the person. As the person moves, such as when the person runs, air pushes and turns the turbine system to generate electricity.

Figure 2A:
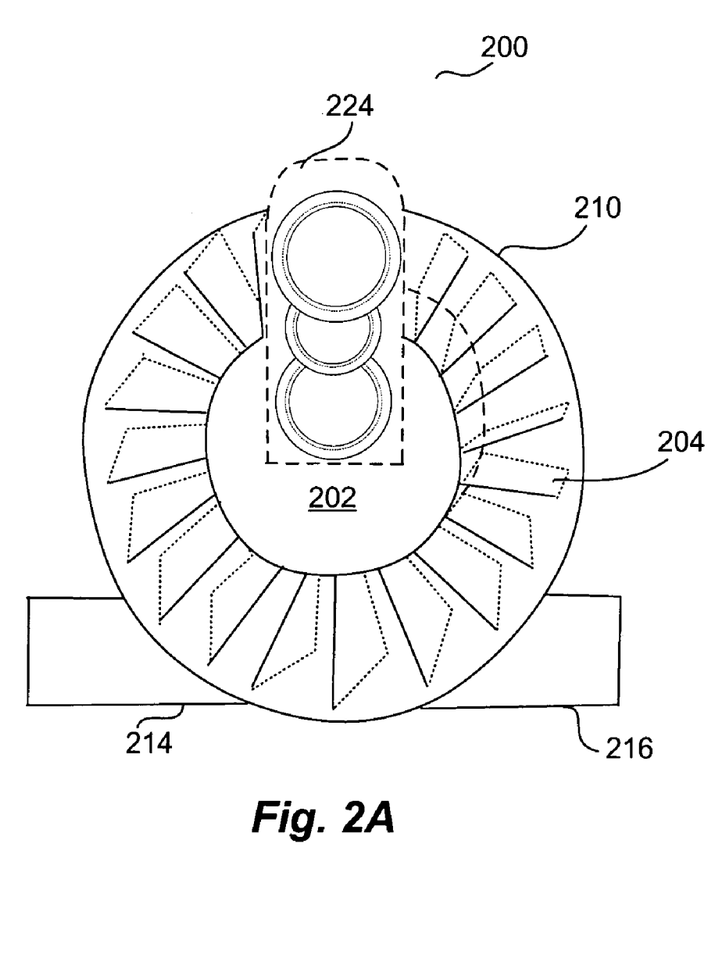
FIGS. 2A-B show another embodiment of a portable turbine system according to the present invention.
Figure 2B:
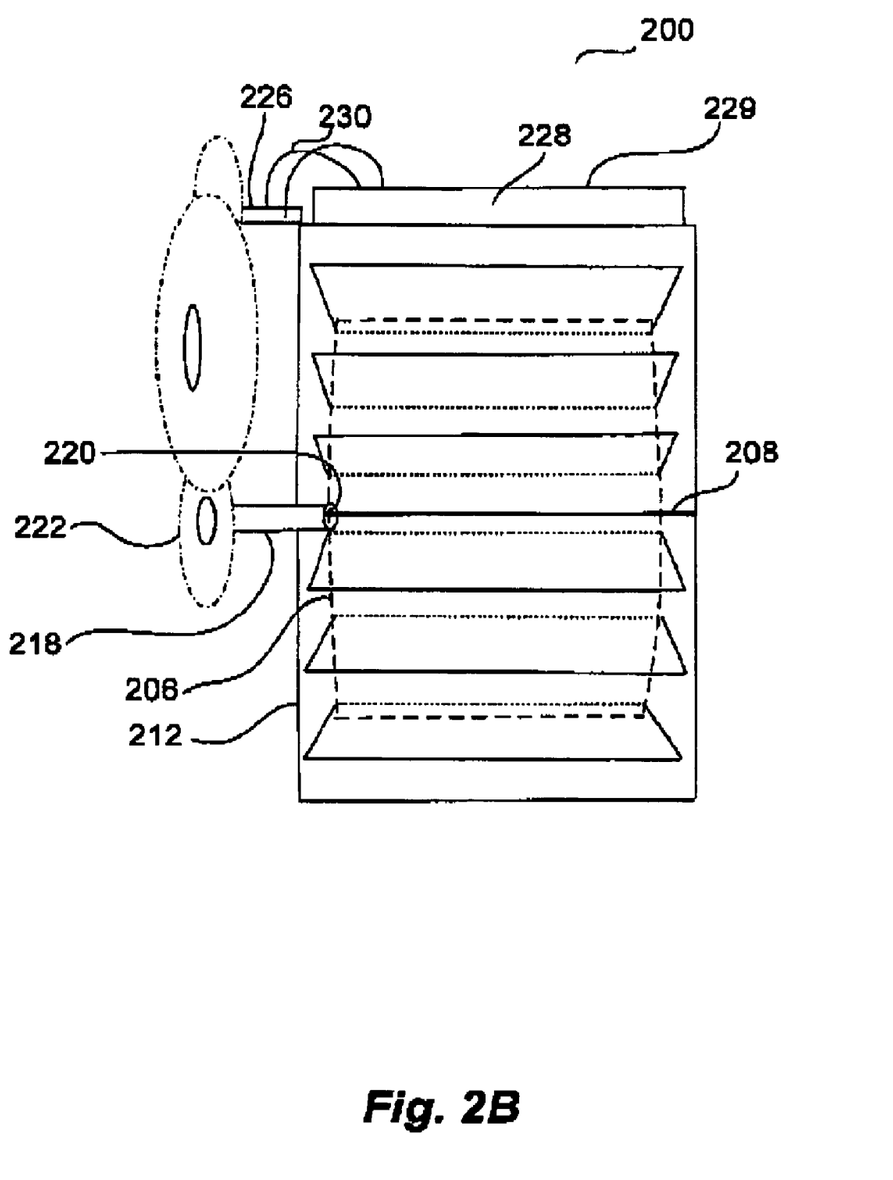

FIGS. 2A-B show another embodiment of a portable turbine system 200. This embodiment includes a hub 202 with paddles 204. In one example, the width of the paddles 204 can be similar to, or slightly less than the width of the hub 202. The hub 202 has a first side wall 206, a second side wall and a shaft or an axle 208, which is located approximately at the center of the hub 202. The axle 208 can be a rod, which can be a metallic rod, or some other types of materials. For example, the rod can be a steel rod that is less than 1/8" in diameter.

The embodiment 200 shown in FIGS. 2A-B also includes a housing 210, with the axle 208 holding the hub 202 in the housing 210. The housing 210 can have an inside cylindrical cavity. In one example, the diameter of the inside cavity can be just slightly larger than the diameter of the hub plus the length of two paddles 204; and the width of the inside cavity can be just slightly larger than the width of the hub 202. The housing also has a first side wall 212 and a second side wall.

In addition, the housing 210 has an input channel 214 (e.g. a tube) and an output channel 216, both connected in proximity to, for example, the bottom of the housing 210. As an example, the width of the input channel can be comparable to the width of a paddle, and the height of the input channel can be comparable to 1/3 of (the diameter of the hub and the length of two paddles). In another embodiment, the input channel 214 is not guiding the fluid to hit the hub 202 right at its middle section. The channels guide fluid into and out of the housing 210 to turn the paddles. In one embodiment, the input 214 and output 216 channels are approximately at the same height from the bottom of the housing 210.

In one embodiment, to reduce weight, the housing and its inside contents can be made of light weight materials. As an example, the hub can be a hollow plastic cylinder that is about 3" wide with circular side walls of 1/8" Plexiglas, having about 3.5" diameter; each paddle can be Plexiglas that is about 1/8" or 1/16" thick, 3" wide and 1.25" long; the housing can be another cylinder that is about 3.5" wide with circular side walls of 1/8" Plexiglas having about 6.5" inside diameter; and both the input and output channels can be 1/16" hard plastic that is about 3" wide and 2.25" high. The cylindrical walls of the cylinders can also be hard plastic with a thickness of about 1/16". And there can be 16 paddles approximately evenly spaced.

In the embodiment 200 shown in FIGS. 2A-B, there can be a disk 218, which can be a cylinder, a dowel or a circular plate. The disk 218 has a first surface 220 and a second surface substantially opposite its first surface. The first surface 220 of the disk 218 can be connected or fixed to the first side wall 206 of the hub 202. The center of the disk 218 can be approximately at the center of the hub 206. The disk 218 can also have a hole approximately at its middle to allow the axle 208 to be in or to extend through. As an example, a disk can be a piece of Plexiglas with a height of 1/2" and a diameter of 3/4".

There can be a hole at the first side wall 212 of the housing 210. In one example where the disk is cylindrical, the diameter of the hole can be slightly bigger than the diameter of the disk 218 to allow the disk 218 to extend out of the hole of the first side wall 212 of the housing 210. Also, there can be a smaller hole at the second wall of the housing to allow the other end of the axle to extend out or through at least a portion of the second side wall of the housing 210.

As explained, the first side 220 of the disk 218 can be connected or fixed to the first side wall 206 of the hub 202, and the second side of the disk can be fixed to a gear 222. So, as the hub 202 turns, the disk 218 turns; and as the disk 218 turns, the gear 222 follows.

The gear 222 can be linked to other gears to form a gear structure 224. The gear structure 224 can be in a gear box outside of the housing 210.

The disk 218 can enhance the strength of the connection between the hub 202 and the gear 222 because a relatively flat surface of the disk 218 can be fixed to a relatively flat surface of the gear 222. Both the disk and the gear do not have to be metallic. They can be light weight materials, like plastic or other materials. The connection can be via different approaches such as via screws or glues. In one embodiment, the disk 218 is beneficial to a stream turbine system because streams can be strong. In view of the power of a stream, the gear structure can have a large gear ratio to generate more electricity. In order for the hub 202 to turn a number of gears, the gear 222 that is fixed to the hub 202 needs to be well connected, and the relatively flat surface of the disk 218 enhances the strength of the connection.

A number of embodiments have been described where a portable turbine system includes a disk to enhance the connection of a hub to a gear. In another embodiment, the system does not include such a disk. Instead, the gear previously fixed to the disk is fixed to the axle of the system. For example, both the axle and the gear are metallic, and the two are fixed to each other by techniques such as welding.

In one embodiment of a portable turbine system, there is a spacer between the first side wall of the hub and the first side wall of the housing; and another spacer between the second side wall of the hub and the second side wall of the housing. The spacers can be supported by the axle of the system, or by a disk of the system. As to its dimensions, in one embodiment, the spacer does not extend beyond the hub of the system. For example, if the spacer is a circular sheet of Plexiglas with a hole in the middle for the axle of the system, in one approach, the diameter of the sheet is less than the diameter of the hub of the system. In one embodiment, the spacers are configured to prevent the paddles and/or the hub of a turbine system from hitting its housing side walls when the hub is turning. As an example, the spacer can be 1/8" thick or can be of other thickness.

At the end of the gear structure 224, there can be a generator 226 to generate electricity. Or the generator 226 is connected to a gear of the gear structure. The gear structure 224 with multiple gears can increase the gear ratio and, in turn, the turning speed for the electric generator 226.

In one embodiment, at least a portion of the gear structure 224 (or the number of gears, the gear ratio or the gear box) can be changed. This can be advantageous because a more powerful stream can run a higher gear ratio to generate more energy.

In one embodiment, the gear structure 224 is coupled to the first side wall 212 of the housing 210. The gear structure 224 can extend up the first side wall 212 of the housing 210. This can enhance the integration of the gear structure 224 to the housing, or make the system 220 more compact.

The electrical outputs from the generator 226 can be connected to a substrate 228 with many electrical components, which can include a printed circuit board. In one embodiment, the top portion of the housing 210 can be flat or rectangular in shape. The substrate 228 can be positioned on the top portion of the housing 210. In another embodiment, the orientation of the substrate 228 can also be along the first side wall 212 of the housing 210. In yet another embodiment, the substrate 228 can be located away from the system 200, but is electrically connected to the system via cables, such as the cables 230.

Depending on the application of the turbine system, there can be different electrical components on the substrate 228. For example, there can be a rechargeable battery on a circuit board.

In one application, a portable turbine system according to one embodiment is used to measure the speed of the fluid where the system is positioned. For example, first the system can be calibrated so that the output (such as its voltage or current) from its generator correlates to the flow speed of a fluid, such as the speed of flowing water. In one calibration approach, different flow speeds of a fluid are independently measured by another method. And the outputs of the system are also measured at the different flow speeds. Then data points regarding outputs versus flow speeds can be generated, and stored in a memory device on the substrate of the system. Via the stored data points, a processor on the substrate can calculate or estimate the flow speeds of a fluid from the outputs of the system.

In one embodiment, a portable turbine system also includes a wireless transceiver or a wireless transmitter. The outputs from the system, such as the calculated or estimated flow speed, or the outputs from the generator, can be wirelessly transmitted to be received by another entity or device. The another entity or device can be a portable device carried by the user using the portable turbine system. In another embodiment, the another entity or device is more remote from the portable turbine system. If signals such as the outputs of the generator are transmitted to the another entity, the another entity can analyze the data to determine the flow speed of the fluid. In different embodiments, the wireless transceiver or transmitter can be based on different protocols, such as Bluetooth, Wifi, WiMax and the cellular network.

A number of embodiments have been described regarding different types of single portable turbine systems. Yet another embodiment includes an array of portable turbine systems connected together. The number of such portable turbine systems connected together can be adjustable, depending on the needs of the user. In one example, the array is applicable as stream turbines.

Figure 3:
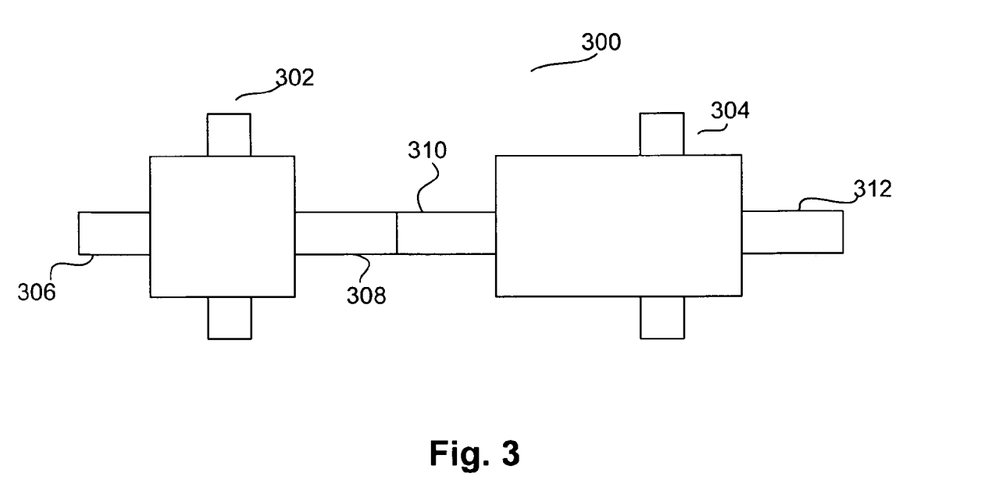
FIG. 3 shows an embodiment of an array with two turbine systems according to the present invention.

FIG. 3 shows the top view of one embodiment 300 of an array with two turbine systems, 302 and 304. In the array, each of the turbine systems includes two connecting mechanisms, approximately on opposite sides of the system. The connecting mechanisms of a portable turbine system with an input channel can be approximately orthogonal to the corresponding input channel. For example, the first turbine system 302 includes a first connecting mechanism 306 and a second connecting mechanism 308. Similarly, the second turbine system 304 includes a first connecting mechanism 310 and a second connecting mechanism 312. As shown in FIG. 3, the second connecting mechanism 308 of the first turbine system 302 is connected to the first connecting mechanism 310 of the second turbine system 304. In the embodiment shown in FIG. 3, the two turbine systems are connected so that the input tubes of both of the systems point substantially in the same direction.

The array shown in FIG. 3 includes two portable turbine systems. More portable turbine systems can be included in the array. All the systems can be connected together by connecting mechanisms, and the connecting mechanisms can be attachable and detachable. With the connecting mechanisms removably attached to each other, in one approach, a user of the array can decide the number of portable turbine systems in the array.

In one embodiment, an array has two portable turbine systems. Each portable turbine system has one connecting mechanism, and the two connecting mechanisms are attached to each other.

In another example, the connecting mechanisms among portable turbine systems in an array are configured such that once two connecting mechanisms are attached together, they are not designed to be detached.

The connecting mechanisms can use different mechanisms. For example, the connecting mechanisms can be based on plastic tubes, and the tubes can be hollow tubes.

In one embodiment, an array of portable turbine systems can be mounted onto an apparatus or a being that moves. For example, the array can be mounted on top of a car. As the car moves, air pushes and turns the turbines to generate electricity. In one embodiment, the connecting mechanisms tying the systems together can be flexible. For example, the connecting mechanisms can be cables, and the array can be tied down on or to an object.

Figure 4:
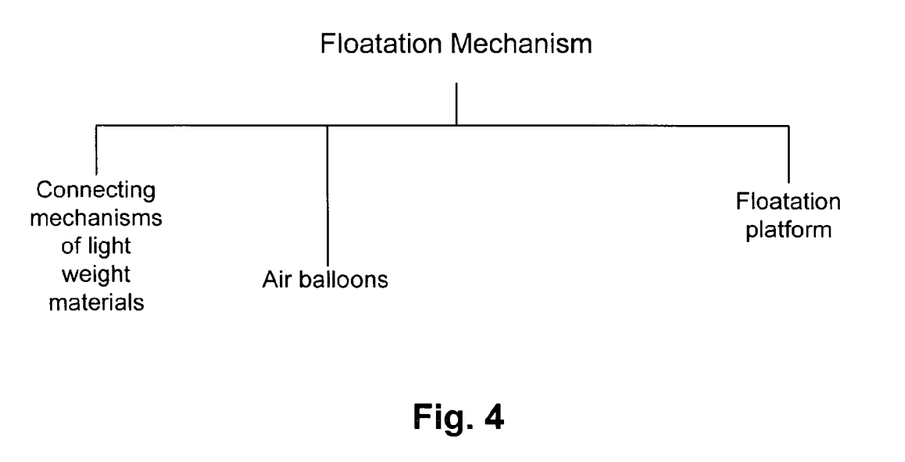
FIG. 4 shows examples of different types of floatation mechanisms according to the present invention.

In one embodiment, a portable turbine system includes floatation mechanisms to keep the system partially afloat on a liquid if the system is used as a portable stream turbine system. The portable turbine system is partially afloat so that at least a portion of the input channel is in the liquid to enhance the liquid flow into the system. FIG. 4 shows examples of different types of floatation mechanisms.

In one embodiment, the connecting mechanisms also function as floatation mechanisms. They can be connecting mechanism made of light-weight hollow materials, such as hollow plastic tubes.

Another embodiment of a floatation mechanism uses gaseous balloons, such as an air balloon. In one embodiment, a balloon can be deflated. As an example, a stream turbine system can be fixed to and supported by one or more air balloons, which can be similar to a personal floatation device, such as a lifejacket or life belt. Or, each connecting mechanism can be supported by an air balloon. In another embodiment, each connecting mechanism is in a shape that allows it to be wrapped around by a gaseous balloon. More than one floatation mechanism can be used to provide redundancy. With the one or more balloons, the system can be on a stream such that at least a portion of its input tube and output tube are immersed in the stream.

Another form of a floatation mechanism includes a platform that floats. An example of a floatation platform is a piece of drafting wood. A stream turbine system can be positioned in or can be partially surrounded by a floatation platform. For example, a stream turbine system can be attached to a floatation platform such that a portion of the system is below the platform. As another example, the input channel of a portable turbine system can be extended out of the platform, or is not blocked by the platform.

In one embodiment, the array 300 includes floatation mechanisms to keep the array 300 afloat and the array can be used as stream turbines.

Figure 5:
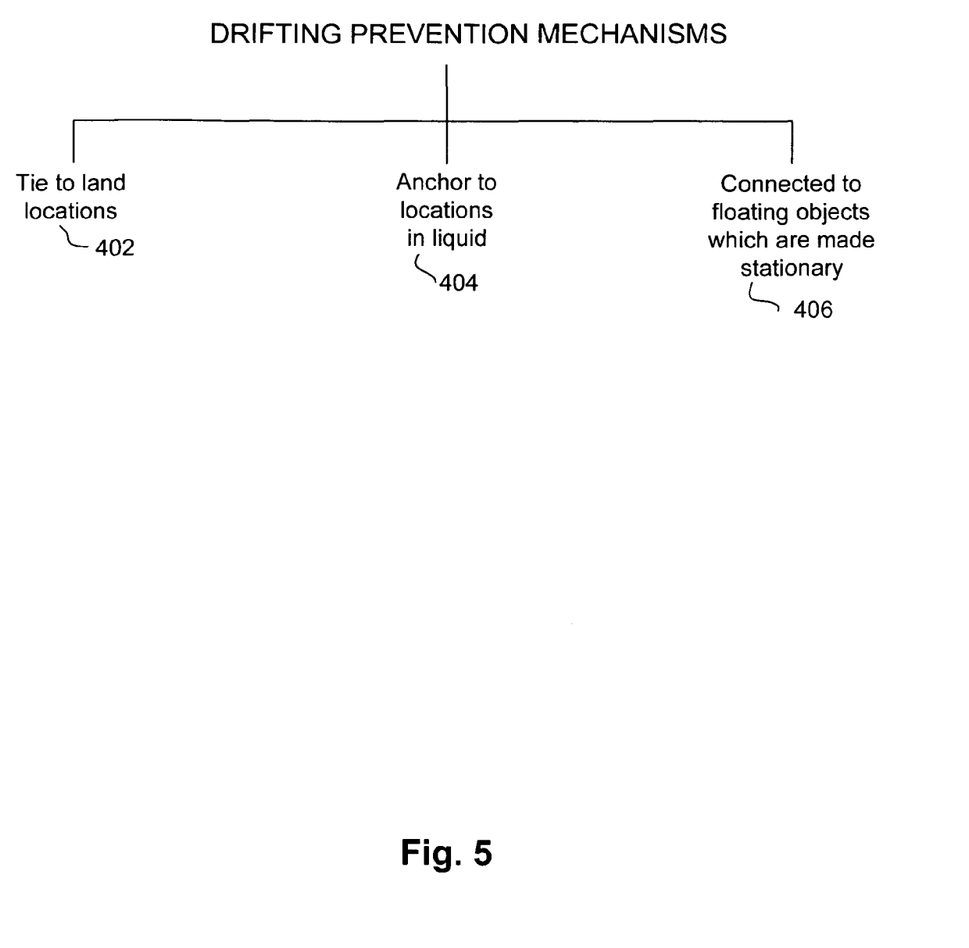
FIG. 5 shows a number of drifting prevention mechanisms according to the present invention.

With the array of stream turbine systems in moving liquid, it is possible for the array to be drifted away by the liquid. FIG. 5 shows a number of drifting prevention mechanisms 400 to prevent the array from being drifted away. The drifting prevention mechanism can also substantially maintain the array's orientation to enhance the liquid flow into the input channels of the stream turbine systems of the array. For example, if the liquid is flowing in the north-south direction, the input channels can also point substantially along such a direction.

One drifting prevention mechanism depends on connecting or tying the array to at least two stationary objects. The objects can be located on land 402. If the array is a row of portable stream turbines, the connecting points on the array can be at or close to the two opposite ends of the row of turbine systems. To illustrate with the embodiment shown in FIG. 3, there can be two strings or cables, one in the vicinity close to the first turbine 302, such as close to its connecting mechanism 306, and the other close to the second turbine 304, such as close to its connecting mechanism 312. In another approach, one of the strings can be at a floatation mechanism of a portable stream turbine system.

In one embodiment, if an array is on a stream, one string can be tied to a stationary object on one side of the stream, and the other string to another stationary object on the another side of the stream. They can be tied to different types of stationary objects, such as the trunk of a tree or a rock. Or they can be anchored to the sand or ground on land. With multiple connections to stationary objects, the array can be substantially prevented from drifting, and its input tubes can be aligned substantially along the flow of the liquid.

In another approach, the array can be connected or tied to at least two substantially stationary locations in a liquid 404. Again using the example in FIG. 3, each of the turbine systems, 302 and 304, can have an anchor at its bottom, or there can be an anchor at a floatation mechanism of a turbine system. In any event, each anchor can be anchored to the floor or ground below, such as the sand at the bottom of the stream where the array is in. With multiple anchors the array is prevented from drifting, and its input tubes can be aligned substantially along the flow of the liquid. In another embodiment, a substantially stationary location in the liquid can be an anchored buoy.

In yet another drifting prevention approach, an array can be connected to floating objects, such as two platforms. The floating objects can be made substantially stationary by connecting them to locations on land or in the liquid. For example, each end of a row of stream turbines can be connected to a floatation platform. This can be done via a connecting mechanism connecting an end of the array to a floatation platform. Each of the floatation platforms can then be made substantially stationary via different mechanisms, such as a string to an object on land, or an anchor to the floor below or close to the platform. In yet another embodiment, a floating object can be a boat.

Note that the above drifting prevention mechanisms can be mixed and matched. For example, an array can be connected to a stationary object on land, and to a floatation platform, which is made substantially stationary.

In one embodiment, a drifting prevention mechanism is applied to just one portable stream turbine system to prevent the system from being drifted away when the system is in liquid, and to substantially maintain the orientation of the stream turbine system, which enhances the liquid flow into the system.

A number of embodiments have been described regarding a row of turbines arranged in an array. In yet another embodiment, there can be rows and columns of portable turbine systems connected together.

A number of embodiments have been described regarding an array of portable turbine systems. The multiple systems do not have to be the same. In one embodiment, at least two of the portable turbine systems in an array are different. For example, the two portable turbine systems include different electronics or electrical components to perform different functions.

Regarding an array of portable turbine systems, in one embodiment, each system has an electrical generator. The outputs (or the electrically processed outputs) from each generator can travel via cables to be processed (or further electrically processed) by electrical components located away from the corresponding system.

Though a number of embodiments have been described regarding a stream turbine system, they are not just applicable to streams. They can be applied, for example, to a moving liquid, where the liquid does not just move up and down. Instead, the liquid flows, or moves in a linear fashion.

A number of embodiments have been described to be connected to stationary objects on land. At least in one embodiment, those objects do not have to be absolutely fixed in position. For example, some tree trunks can sway in the wind to a certain extent, particularly when the wind is strong; these trees can still be considered as stationary objects.

A number of embodiments have been described regarding a portable stream turbine system. In one embodiment, the system includes (a) a hub with a first and a second side walls, with an axle approximately at the centers of the side walls of the hub; (b) a number of paddles attached to the hub; (c) a disk with a first surface and a second surface substantially opposite the first surface, the first surface of the disk being fixed to the first side wall of the hub, with the center of the disk substantially at the center of the hub; (d) a housing with a first and a second side walls, with the axle configured to hold the hub in the housing, wherein there is a hole at the first side wall of the housing allowing the disk to extend through, and there is a hole at the second side wall of the housing allowing the axle to extend through; (e) an input channel connected to the housing; (f) an output channel connected to the housing; (g) a gear structure, with a number of gears including a first gear fixed to the second side of the disk; (h) a generator connected to a gear of the gear structure; and (i) a number of electrical components on a substrate electrically connected to the outputs of the generator to perform a function; (j) wherein as a liquid enters the input channel and exits the output channel, the liquid turns the paddles, which turns the hub, the disk and the gears to enable the generator to generate electricity so as to perform the function by the electrical components on the substrate.

A number of embodiments have been described regarding a portable or handheld turbine systems. In yet another embodiment, a turbine system can be used in drainage pipes in a house. There are numerous drainage pipes in a typical house. These pipes are typically for guiding liquid or other materials out of or away from the house. For example, downspouts are typically for guiding rainwater away from the house; shower drainage pipes are typically for guiding shower water; and toilet sink drainage pipes are typically for guiding waste materials with water. Day after day, liquid flows down these pipes.

In one embodiment of the invention, at least a turbine is inside such a pipe. As liquid flows down the pipe, the liquid turns the turbine. The electricity can be used to run household appliances or for other applications.

Typically, the liquid includes waste materials. These waste materials can be relatively large. For example, the waste materials can be leaves or other debris in rainwater. In one embodiment, in the vicinity of the inlet of a downspout, there can be an overlying cover for deflecting leaves and other debris from entering and potentially clogging the downspout. Different mechanisms are available to deflect such debris in a downspout, and would not be further discussed.

A typical downspout extends from the roof of the house to the ground. In one embodiment, the turbine inside the downspout is located close to the ground. For example, the downspout has at least two parts, an upper and a lower part. The upper part can extend from the roof down to, such as, 80% to 90% of the length of the downspout. The upper part can be separated from the lower part. The turbine inside the downspout can be located at the lower part. If the turbine malfunctions, the turbine can be replaced by replacing the lower part of the downspout with a new one.

In yet another embodiment, the downspout can have more than one turbine. For example, a downspout splits into two paths at its bottom. Each path can have a turbine. Such an embodiment could provide redundancy. When one turbine malfunctions, the other one can take over. In one embodiment, the two paths at the bottom of a downspout can be separately replaced. When one of the turbines malfunctions, the corresponding path with that turbine can be removed. During the removal process, after the path with the malfunctioned turbine is separated, one can cover the hole with a mechanism, such as a cap. The liquid coming down the downspout would then be directed to the path with the functioning turbine. When the replacement path becomes available, the cap can be removed with the replacement path put in.

The waste materials can be fine particles. For example, the waste materials can be soapy materials in shower water. In one embodiment, in the vicinity of the inlet of the drainage pipe, there is a filter. The filter is for removing the fine particles from the liquid before the liquid runs down the drainage pipe to turn the turbine inside the pipe. In another embodiment, the filter can be removed from the drainage pipe to be cleaned.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The invention can be implemented in software, hardware or a combination of hardware and software. A number of embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Also, in this specification, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

The invention claimed is:

1. A portable turbine system comprising:
   a hub with a plurality of paddles;
   a housing;
   an axle holding the hub in the housing;
   an input channel connected to the housing;
   an output channel connected to the housing;
   a gear structure, with a plurality of gears, with at least one gear fixed to at least a portion of the hub;
   a generator connected to a last gear of the gear structure; and
   a plurality of electrical components on a substrate electrically connected to an output of the generator;
   wherein as a fluid enters the input channel and exits the output channel, the fluid turns the paddles, which turns the hub, and the gears to enable the generator to generate electricity, which is used by the electrical components to perform a function,
   wherein the housing includes a side surface and a second surface,
   wherein the plurality of gears of the gear structure extend towards an end of the side surface, with the last gear extended towards the end of the side surface being connected to the generator,
   wherein the substrate is coupled to the second surface, and
   wherein the generator extends towards the housing and the generator's outputs are configured to be connected to the plurality of electrical components on the substrate.

2. A portable turbine system as recited in claim 1,
   wherein the portable turbine system further includes a wireless transceiver, which is configured to wirelessly transmit information relating to the function to another device.

3. A portable turbine system as recited in claim 1, wherein the second surface is a top surface of the housing.

4. A portable turbine system as recited in claim 1, wherein the function is related to measuring a speed of flow of the fluid, when the system is being used in the fluid.

5. A portable turbine system as recited in claim 4, wherein the portable turbine system further includes a wireless transceiver, which is configured to wirelessly transmit information relating to the speed of flow of the fluid to another device.

6. A portable turbine system as recited in claim 1, wherein the portable turbine system further includes a floatation mechanism to configure to keep the system partially afloat on the fluid, with at least a portion of the input channel configured to be in the fluid, when the system is being used in the fluid.

7. A portable turbine system as recited in claim 6, wherein the floatation mechanism includes a gaseous balloon.

8. A portable turbine system as recited in claim 6, wherein the floatation mechanism includes a platform that is configured to float in the fluid, when the system is being used in the fluid.

9. A portable turbine system as recited in claim 8,
   wherein at least a portion of the turbine system is below the platform, and
   wherein the input channel is configured not to be blocked by the platform.

10. A portable turbine system as recited in claim 1, wherein the turbine system further includes a drifting prevention mechanism to prevent the turbine system from being drifted away when the turbine system is being used in the fluid, and to substantially maintain the orientation of the turbine system, which enhances the fluid flow into the input channel of the turbine system.

11. An array of portable turbine systems comprising:
a first portable turbine system including
    a first input channel to allow a fluid to enter the first system;
    a first output channel to allow the fluid to exit the first system; and
    a first connecting mechanism;
a second portable turbine system including
    a second input channel to allow the fluid to enter the second system;
    a second output channel to allow the fluid to exit the second system; and
    a second primary and a second secondary connecting mechanism; and
a third portable turbine system including
    a third input channel to allow the fluid to enter the third system;
    a third output channel to allow the fluid to exit the third system; and
    a third connecting mechanism,
wherein the first connecting mechanism is removably attached to the second primary connecting mechanism, and the second secondary connecting mechanism is removably attached to the third connecting mechanism to form the array of portable turbine systems.

12. An array of portable turbine systems as recited in claim 11,
wherein the array further comprises one or more portable turbine systems, and
wherein the plurality of portable turbine systems in the array are removably connected together.

13. An array of portable turbine systems as recited in claim 11, wherein the array further comprises a floatation mechanism to keep the array partially afloat on the fluid, with at least a portion of the input channels in the fluid, when the array is being used in the fluid.

14. An array of portable turbine systems as recited in claim 13, wherein at least a portion of the floatation mechanism is at one of the connecting mechanisms.

15. An array of portable turbine systems as recited in claim 11 further comprising a drifting prevention mechanism to prevent the array from being drifted away when the array is being used in the fluid, and to substantially maintain the orientation of the array, which enhances the fluid flow into the input channels of the turbine systems of the array.

16. An array of portable turbine systems as recited in claim 15, wherein the drifting prevention mechanism depends on connecting the array to at least a stationary object on land.

17. An array of portable turbine systems as recited in claim 15, wherein the drifting prevention mechanism depends on anchoring the array to at least a substantially stationary location in the fluid.

18. An array of portable turbine systems as recited in claim 15, wherein the drifting prevention mechanism depends on connecting the array to at least a floating object, which is made substantially stationary.

19. An array of portable turbine systems as recited in claim 18, wherein the portable turbine systems further include a wireless transceiver, which is configured to wirelessly transmit information relating to a function performed by the systems to another device.

20. An array of portable turbine systems comprising:
a first portable turbine system including a first connecting mechanism; and
a second portable turbine system including a second connecting mechanism,
wherein the first connecting mechanism is removably attached to the second connecting mechanism,
wherein the array of portable turbine systems further comprises a plurality of portable turbine systems, and
wherein the plurality of portable turbine systems with the first and the second portable turbine systems are configured into at least two rows of portable turbine systems connected together, with one row being in front of the other row.

* * * * *